UNITED STATES PATENT OFFICE 2,526,007

CHLORINATION OF ALKOXY ESTERS

Willard J. Croxall, Bryn Athyn, and Marian F. Fegley, Mont Clare, Pa., assignors to Rohm & Haas Company, Philadelphia, Pa., a corporation of Delaware No Drawing. Application August 19, 1949, Serial No. 111,331

6 Claims. (Cl. 260—484)

This invention deals with the preparation of esters of the formula

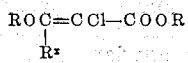

wherein R is an alkyl group, particularly an alkyl group of not over four carbon atoms, and $R^x$ represents hydrogen or the group —COOR. It concerns a method for preparing a compound of this formula wherein an alkoxy ester

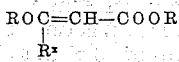

is reacted by adding chlorine thereto and heating the resulting addition product to form the above monochloro ester. The addition product is apparently of the formula

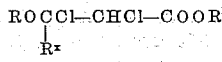

The starting esters are β-alkoxy esters which are available through the reaction of acetylene and dialkyl carbonates in the presence of an anhydrous strongly basic catalyst. Full details of preparation of the alkoxy esters are given by Croxall and Schneider in application Serial No. 52,607, filed October 2, 1948. By this reaction there are formed β-ether acrylates, β,β-diether propionates, ether maleates, and diether succinates.

The β,β-diether propionates are readily converted to β-ether acrylates and diether succinates to ether maleates when the diether compounds are heated in the presence of a dealcoholating catalyst, such as an alkali metal acid sulfate, and a mole of alcohol taken off per mole of ester. This process is described in application Serial No. 52,608 filed by Croxall and Schneider on October 2, 1948.

For preparation of an alkoxy ester there may thus be taken a carbonate ester, (RO)₂CO, in which R is a non-tertiary alkyl group, preferably of not over four carbon atoms for purposes of the present invention. Acetylene is reacted therewith at 20° C. to 110° C. in the presence of a strongly alkaline catalyst, such as an alkali metal acetylide, an alkali metal alcoholate, or a strongly basic quaternary ammonium alkoxide. When acetylene is no longer taken up by the reaction mixture, the catalyst is destroyed as with acid and the reaction mixture is separated, usually by distillation. A fraction containing both ether acrylates and propionates is readily obtained. There are also obtained in mixture or separately ether maleates and succinates.

While acrylate may be separated from propionate or maleate from succinate, the respective mixtures may be heated at 150° C. to 250° C. in the presence of an alkali metal acid sulfate, a strong acid, or an alkaline catalyst and alcohol split from the diether propionate or diether succinate to give the corresponding acrylate or maleate.

Typical of the carbonate esters which lead to the ether esters utilized in the present invention are dimethyl carbonate, diethyl carbonate, dipropyl carbonate, diisopropyl carbonate, dibutyl carbonate, diisobutyl carbonate, and di-sec.-butyl carbonate. Esters of carbonic acid and higher non-tertiary alcohols undergo the same reaction with acetylene, but are not ordinarily of interest for present purposes. Typical catalysts for effecting the reaction with acetylene are sodium acetylide, potassium acetylide, sodium methylate, sodium ethylate, potassium butoxide, benzyl trimethyl ammonium ethoxide, dibenzyl dimethyl ammonium tert.-butoxide, etc. The catalyst is used in an amount from 0.01% to 5% of the weight of the carbonate ester.

To illustrate the reaction of dialkyl carbonate and acetylene there is given the following example of the preparation of ether esters. The apparatus used comprised a five-liter flask and a gas-tight, stainless-steel stirrer. Therein was placed 225 grams of anhydrous ethyl alcohol and small cubes of sodium were gradually added to a total of 30 grams. The sodium was dissolved and excess alcohol removed under reduced pressure. To the flask containing sodium ethylate there was added 2200 grams of diethyl carbonate. The flask was then equipped with gas inlet and outlet tubes, manometer, and thermometer. It was flushed with nitrogen and heated to 80° C. Acetylene was passed in. When the rate of absorption became very slow, the flask was cooled and the flow of acetylene discontinued. Dilute acetic acid was added to destroy the catalyst. Two layers were formed. The upper, oily layer was separated and fractionally distilled.

A forerun taken at atmospheric pressure consisted of ethyl alcohol and ethyl carbonate. Distillation was continued under reduced pressure. A fraction distilled at 65°–75° C./2–4 mm. consisted of about 10% of ethyl β-ethoxyacrylate and 90% of ethyl β,β-diethoxypropionate. At 75° C./4 mm. a fraction of pure ethyl β,β-diethoxypropionate was obtained. Between 75° C./4 mm. and 114° C./3 mm. a mixture of ethyl β,β-diethoxypropionate and diethyl α,α-diethoxysuccinate was taken off. At 114°–115° C./3–4 mm.

there was obtained a fraction consisting of diethyl α,α-diethoxysuccinate. On further distillation a fraction containing this ether succinate and diethyl α-ethoxymaleate was obtained.

In the same way other esters of carbonic acid and monohydric alcohols may be reacted with acetylene to give ether propionates, acrylates, succinates, and maleates. Other alkaline catalysts may be used in the place of sodium ethylate.

Typical ether esters which are thus available include methyl β-methoxyacrylate, methyl β,β-dimethoxypropionate, ethyl β-ethoxyacrylate, ethyl β,β-diethoxypropionate, propyl β-propoxyacrylate, propyl β,β-dipropoxypropionate, butyl β-butoxyacrylate, butyl β,β-dibutoxypropionate, dimethyl α,α-dimethoxysuccinate, diethyl α,α-diethoxysuccinate, dibutyl α,α-dibutoxysuccinate, dimethyl α-methoxymaleate, diethyl α-ethoxymaleate, and dibutyl α-butoxymaleate. Other ether esters are similarly available, but the above are examples of the preferred esters readily available through reaction of carbonate and acetylene.

The diether propionates and succinates are readily converted to comparable ether acrylates and maleates, as indicated above, by heating them or mixtures containing them with a dealcoholating catalyst between 80° and 250° C. The catalyst may be an anhydrous strongly alkaline agent or an acidic catalyst. There is split out a molecule of alcohol for each molecule of the starting diether ester. This is taken off at normal or reduced pressure. The catalyst may then be removed, as by washing, and the unsaturated ester recovered.

Optimum temperatures for converting diether succinates to ether maleates vary somewhat with different catalysts. Typical optimum temperatures for specific catalysts are 200°–220° C. for zinc chloride, 180°–200° C. for sulfuric acid, 180°–200° C. for sodium acid sulfate, 160°–180° C. for p-toluene sulfonic acid, and 130°–165° C. for sodium ethylate.

Some typical conversions of diether propionates to ether acrylates and diether succinates to ether maleates follow.

Example A-1

There were charged to a reaction vessel equipped with a short packed column 192 grams of ethyl β,β-diethoxypropionate and one gram of sodium acid sulfate. The mixture was heated slowly. At about 80° C., there began to be evolved vapors which, when condensed, proved to be those of ethyl alcohol. The heating was continued and the temperature of the batch steadily increased. At 114° to 150° C., there was a good evolution of vapor about the particles of catalyst. There was taken off through the column a distillate boiling at 78.5° to 80° C., amounting to 44.5 grams of ethyl alcohol. With the batch temperature finally carried to about 160° C., there was taken off an intermediate fraction of fifteen grams with an overhead temperature between 80° and 90° C. The pressure was then reduced and the main fraction taken off at overhead temperatures of 85.5°–86.5° C. at 19 mm. There remained a residue of thirteen grams.

The main fraction had a refractive index, $n_D^{20}$, of 1.447 and corresponded in composition to ethyl β-ethoxyacrylate.

Example A-2

In accordance with the method of Example A-1, there were heated ninety-six grams of n-butyl β,β-di-(n-butoxy)propionate and 0.25 gram of sodium acid sulfate. Between 110° and 160° C. (batch temperature), there was evolved n-butanol, which was taken off at overhead temperatures of 110°–114° C. With the temperature of the reaction mixture finally advancing to about 180° C., there was then taken off a main fraction, boiling at 110°–111° C./3 mm. There remained twelve grams of residue. The main fraction contained by analysis 66.12% of carbon and 9.64% of hydrogen, corresponding to butyl β-butoxyacrylate. The theoretical analytical values of this compound are 66.00% for carbon and 10.00% for hydrogen. The product had a saponification number of 288, compared to the theoretical value of 290.

Example A-3

In a flask equipped with a short column, there were placed 0.25 gram of sodium and twenty milliliters of ethanol. The sodium was reacted with the alcohol and excess ethanol removed by heating under reduced pressure to give a white, powdery sodium ethylate. Thereto was added fifty grams of ethyl β,β-diethoxypropionate, and the reaction mixture was heated at atmospheric pressure at first and then at reduced pressure. At batch temperatures of 90° to 150° C., the charged ester was decomposed. There were obtained ten grams of ethanol (boiling at 78.5° C.), an intermediate fraction, distilling at overhead temperatures of 78.5° C. to 51.5° C./1.5 mm., and twenty-four grams of ethyl β-ethoxyacrylate, distilling at 51° C./1.5 mm. overhead temperature.

Example A-4

The procedure of Example A-1 was applied to a charge of 954 grams of methyl β,β-dimethoxypropionate and 0.1 gram of sodium acid sulfate. There were obtained 185 grams of methanol and 650 grams of methyl β-methoxyacrylate, boiling at 60° C./12 mm. and having a refractive index, $n_D^{19}$, of 1.4501.

Example A-5

The general procedures of the previous examples were applied to a reaction mixture of 292 grams of diethyl α,α-diethoxysuccinate and 0.5 gram of sodium acid sulfate. At batch temperatures of about 200° C., there were obtained ehtanol in the amount of forty-six grams and 143 grams of diethyl α-ethoxymaleate, distilling with an overhead temperature of 97°–98° C./0.5 mm. and having a refractive index of 1.4562. Analysis of the distillate gave the following values: Carbon, 55.83% and hydrogen, 7.65%, compared to theoretical values of 55.55% and 7.39%, respectively.

Example A-6

In a five hundred milliliter flask carrying a twelve-inch column packed with glass helices and a sidearm through which a capillary tube was inserted, there were placed 206 grams of dimethyl α,α-dimethoxysuccinate and two drops of 95% sulfuric acid. A slow stream of nitrogen was passed into the flask through the capillary tube, and the flask and contents were heated to about 190° C. Methanol was slowly distilled out of the flask. The temperature of the batch was then increased gradually to 200° C. The pressure thereover was reduced. A distillate was taken off up to 120° C./15 mm. and was found to consist of methanol, unchanged dimethyl α,α-dimethoxysuccinate, and dimethy methoxymaleate. There was obtained at 120° to 130° C./15–16 mm. a fraction of pure dimethyl methoxymaleate amounting to ninety-six grams. When this fraction was left standing, it formed crystals which melted at 40° C.

By methods such as described above, there are obtained the alkyl β-alkoxyacrylates and dialkyl α-alkoxymaleates which are the starting materials for the present process. They are reacted with chlorine at about −5° to 20° C. The reaction may be performed by running chlorine into ether acrylate or maleate. For this reaction, the ether acrylate or maleate may be advantageously extended with an inert organic solvent, such as carbon tetrachloride, ethylene dichloride, or the like. Chlorine is run into the reaction mixture until about two equivalents per mole of ester have been added.

If solvent was used, it is now removed. The reaction mixture is heated to 120° to 250° C., preferably 150°–170° C. Reduced pressure may be used, if desired. Hydrogen chloride is evolved. It may be driven off as a gas or there may be used an absorber for hydrogen chloride, such as calcium carbonate, sodium carbonate, sodium bicarbonate, or a tertiary amine, such as trimethylamine.

The products are generally purified by distillation at low pressure. They are useful chemical intermediates. They are solvents for resinous materials. The butyl esters, particularly, are effective plasticizers.

Preparation of α - chloro - β - alkoxy esters is shown with greater detail in the following examples:

Example B–1

(a) There were mixed in a reaction vessel equipped with stirrer, reflux condenser, and gas inlet tube 216 parts by weight of ethyl β-ethoxyacrylate and 200 parts of chloroform. This mixture was cooled by use of a salted ice bath. Chlorine gas was bubbled through the mixture while it was kept below 10° C. When an excess of chlorine had been added as shown by development of a yellow color, the passage of chlorine was discontinued. Excess chlorine and part of the chloroform were removed under reduced pressure while the reaction mixture was gently warmed. The product was ethyl α,β-dichloro-β-ethoxypropionate in chloroform solution.

(b) A mixture of 178.5 parts of ethyl β-ethoxyacrylate and 250 parts of chloroform was reacted with chlorine was in (a) above. Excess chlorine and chloroform were taken off by heating. Hydrogen chloride was evolved and the material in the reaction vessel was heated to 150°–160° C. for two hours. It was then fractionally distilled. A forerun of a small amount of ethyl β-ethoxyacrylate was obtained at 95°–150° C./61 mm. At 150°–155° C./61 mm. there was distilled ethyl α-chloro-β-ethoxyacrylate. It has a refractive index, $n_D^{20}$, of 1.4728. By analysis the product obtained contained 20.11% of chlorine. The theoretical chlorine content for ethyl-α-chloro-β-ethoxyacrylate is 19.85%. The yield was 92%.

Example B–2

Ethyl α,β - dichloro - β - ethoxypropionate was prepared as in Example B–1 (a) above. It was run very slowly into a mixture of 1.35 gram moles of triethylamine in 400 ml. of ethyl ether until 1.28 gram moles of the ether ester had been added. Triethylamine hydrochloride was formed and was separated by filtration. The ether was distilled off and the resulting material filtered to remove additional triethylamine hydrochloride which had separated. It was then distilled at 78°–80° C./1 mm. to give a 78% yield of ethyl α-chloro-β-ethoxyacrylate.

Example B–3

(a) A solution of 116 parts by weight of methyl β-methoxyacrylate in 250 parts of chloroform was cooled to 10° C. and treated with chlorine gas as in Example B–1 (a). The temperature of the reaction mixture was kept between 2° and 10° C. by use of an ice-salt bath. As soon as a yellow color developed, excess chlorine was taken off along with most of the chloroform by stripping under reduced pressure. The product thus obtained was methyl α,β-dichloro-β-methoxypropionate.

(b) A portion of this product was heated at 170° C. for 1.5 hours. Hydrogen chloride was taken off as it was evolved. The heated product was then fractionally distilled. A forerun of methyl β-methoxyacrylate was taken off at 95°–124° C./28 mm. At 124°–128° C./28 mm., a fraction was distilled which corresponded in composition to that of methyl α-chloro-β-methoxyacrylate. The redistilled product boiled at 124°–125° C./28 mm. and had a refractive index, $n_D^{20}$, of 1.4838.

Example B–4

(a) A mixture of 31.5 parts of butyl β-butoxyacrylate in 75 parts of chloroform was cooled to 5° C. and chlorine passed therethrough while the temperature was kept between 0° and 8° C. by means of an ice-salt bath. The chloroform was distilled from the reaction mixture and the resulting material heated at 160°–180° C. for an hour. It was then distilled at low pressure. After a forerun of butyl β-butoxyacrylate, there was obtained a fraction of 18 parts which distilled at 135°–146° C./4 mm. and corresponded in composition to butyl α-chloro-β-butoxyacrylate.

(b) A mixture of 89 parts of ethyl α-chloro-β-ethoxyacrylate, 112 parts of normal butyl alcohol, and 2 parts of p-toluene sulfonic acid was heated in a reaction vessel equipped with a packed distilling column topped with partial take-off head. Ethanol was distilled from the reaction mixture. When it was no longer obtained, the temperature was raised and butanol was taken off. The mixture was then subjected to fractional distillation at reduced pressure. A forerun of eight parts distilling at 90°–122° C./4 mm. consisted of mixed ethyl α-chloro-β-ethoxyacrylate and butyl α-chloro-β-butoxyacrylate. At 122°–145° C./4 mm., there was obtained butyl α-chloro-β-butoxyacrylate in an amount of 65 parts. This material was redistilled at 142°–144° C./4 mm. to give a very pure product, which had a refractive index of 1.4674 and which contained by analysis 14.75% of chlorine (theory 14.76%).

The above example shows how the ether acrylates can be transetherified and transesterified as a means of passing from a lower ester to a higher. It should also be mentioned that by use of a mild dealcoholating catalyst, such as sodium acid sulfate, a smaller ether group may be replaced with a larger one without changing the ester group. Thus, ethyl β-ethoxyacrylate is heated with butyl alcohol to yield ethyl β-butoxyacrylate or with octyl alcohol to yield ethyl β-octoxyacrylate. As shown above, the α-chloro-β-alkoxyacrylates similarly undergo ether and ester interchange. The same reactions can be effected with the β-chloro-α-alkoxymaleates.

The interchange reactions are useful for introducing other than alkyl groups. Thus, unsaturated groups or cyclic groups may replace the simple alkyl groups of the alkyl α-chloro-β-alkoxyacrylates or comparable maleates. When allyl type groups are used in the ether grouping, rearrangements result on heating. This interesting development is illustrated in the following example.

*Example B-5*

(a) A reaction vessel was charged with 269 parts of ethyl α-chloro-β-ethoxyacrylate, 265 parts of allyl alcohol, and 4 parts of p-toluene sulfonic acid. The vessel carried a packed distilling column with a partial take-off distilling head. The charge was heated under reflux and there was fractionally distilled therefrom through the column 137 parts by weight of ethyl alcohol. The reaction mixture was treated with three parts of β-naphthol and distilled under reduced pressure. Excess allyl alcohol was distilled off. A fraction was then obtained at 50°–122° C./2 mm., which was a mixture of allyl α-chloro-β-alloxy-acrylate and allyl α-chloro-α-allylmalonaldehydate. At 116°–125° C./2 mm., there was obtained a fraction of 176 parts by weight of allyl α-chloro-β-alloxyacrylate.

(b) In a reaction vessel equipped with a packed column carrying a partial take-off head, there was heated 416 parts of allyl α-chloro-β-alloxyacrylate to which 5 parts of β-naphthol had been added. Rearrangement began to occur slowly with the tempertaure at about 50° C. The rate of rearrangement was found to increase at temperatures of 75°–150° C. The reaction mixture was fractionally distilled under reduced pressure. At 48°–55° C./1 mm., there was slowly taken off a fraction of 359 parts. This was identified as allyl α-chloro-α-allylmalonaldehydate. Between 55° and 70° C./1 mm., there was obtained a mixture of the above malonaldehydate and allyl α-chloro-α-alloxyacrylate.

The main fraction was redistilled at 46°–50° C./1 mm. The redistilled product had a refractive index, $n_D^{20}$, of 1.4580. It contained by analysis 17.56% of chlorine. The theoretical chlorine content of $OHCCCl(C_3H_5)COOC_3H_5$ is 17.50% of chlorine.

*Example B-6*

(a) A reaction vessel equipped with stirrer, condenser, and gas inlet tube was charged with 108 parts of diethyl α-ethoxymaleate and 200 parts of chloroform. The solution was cooled to 10° C. and chlorine was bubbled through the solution. The temperature of the reaction mixture was held below 12° C. by external cooling. When excess chlorine had been added, the chloroform was distilled along with free chlorine by gentle warming under reduced pressure. The product remaining was diethyl α,β-dichloro-β-ethoxysuccinate.

(b) The above preparation was repeated, but the chloroform was distilled off at atmospheric pressure and the material remaining was heated slowly until an upper limit of 220° C. was reached. Hydrogen chloride was evolved and was taken off. The material was then subjected to fractional distillation at low pressure. At 90°–112° C./3 mm., unreacted diethyl ethoxymaleate was recovered. At 113° C.–129° C./3 mm., there was obtained diethyl α-chloro-β-ethoxymaleate in an amount of 116 parts. A residue of 8 parts remained. The product was redistilled at 118°–121° C./3 mm. It then had a refractive index, $n_D^{20}$, of 1.4670, a molecular refraction, $MR_D$, of 58.335 (theory 57.731), and a density, $d_4^{20}$, of 1.1924.

In the same way dibutyl α-butoxymaleate was chlorinated, the intermediate heated, and the resulting materials distilled. The fraction distilling at 130°–138° C./2 mm. corresponds in composition to dibutyl α-chloro-β-butoxymaleate. This product has plasticizing action on polyvinyl chloride.

From the alkyl α-chloro-β-alkoxyacrylates there may be prepared the corresponding alkyl α-chloro-β-hydroxyacrylates. One method to accomplish this utilizes acetic acid. For example, 156 parts by weight of ethyl α-chloro-β-ethoxyacrylate is heated in 100 parts of toluene with 53 parts of glacial acetic acid and one part of p-toluene sulfonic acid. After the mixture is heated for about seven hours under reflux with trapping of a small amount of water, the material is fractionally distilled. Ethyl acetate is taken off at 72°–84° C. and a mixture of acetic acid and toluene at 84° to 110° C. At 68° C./25 mm. to 75° C./28 mm., the fraction obtained consists of ethyl α-chloro-β-hydroxyacrylate, amounting to 39 parts. Between 75° C./26 mm. and 92° C./2.7 mm., a fraction of 16 parts contains both this compound and the starting material.

Ethyl α-chloro-β-hydroxyacrylate is an insecticidal and fungicidal agent. In tests against the bean aphid it gives kills of 76% at dilutions of 1:900, 86% at 1:600, and 100% at 1:300. It is fungistatic at concentrations as low as 0.005% against *Macrosporium sarcinaeforme* and 0.01% against *Sclerotinia fructicola*.

Another way to prepare ethyl α-chloro-β-hydroxacrylate is through hydrolysis. Thus, a charge of 223 parts of ethyl β-ethoxyacrylate is treated with chlorine at 0° to 10° C. until development of a yellow color indicates complete conversion to ethyl α,β-dichloro-β-ethoxypropionate. Thereto is added with stirring a 500 part portion of water over a 45 minute period while the temperature of the mixture is held below about 15° C. Stirring is continued for another 30 minutes. The water layer is then separated and extracted with chloroform and then twice with ether. Extracts and oil layer are combined and dried over sodium sulfate. The dried solution is then fractionally distilled. The solvents are taken off followed by a small forerun up to 47° C./21 mm. At 47°–130° C./21 mm., there is obtained about 180 parts of ethyl α-chloro-β-hydroxyacrylate, which crystallizes on standing. On redistillation this product distils chiefly at 67°–69° C./21 mm.

The alkyl α-chloro-β-alkoxyacrylates react with alcohols under the influence of alkaline catalysts. A typical reaction of this sort is the following: A solution of one gram of sodium in 40 grams of anhydrous ethanol is prepared and added slowly with stirring to 119 grams of ethyl α-chloro-β-ethoxyacrylate in 100 grams of anhydrous ethanol. The temperature rises from 25° C. to 42° C. during the addition. The solution is then held at 50°–60° C. for an hour, cooled, neutralized with acid, and filtered. Ethanol is distilled from the solution and the oil obtained is washed with water and dried over sodium sulfate. After a small forerun is removed, a main fraction of 102 grams is obtained at 98°–99° C./6 mm. It is ethyl α-chloro-β,β-diethoxyacrylate, having a refractive index of 1.4273.

As is shown above, an alkyl β-alkoxyacrylate or a dialkyl α-alkoxymaleate is reacted with chlorine to give an intermediate which is heated to give alkyl α-chloro-β-alkoxyacrylates and dialkyl α-chloro-β-alkoxymaleates respectively. The described process is of particular importance when applied to such esters in which the alkyl group contains one to four carbon atoms but is not limited thereto. As is evident from the above illustrative examples, the identical course of reaction is followed with methyl, ethyl, propyl, or butyl groups as the alkyl groups. It is further shown that the R groups in a given ether ester need not be identical as one alkoxy group may be transetherified with another alkyl group or with other than an alkyl group. Also, both transetherification and transesterification may be performed. This is a convenient way to introduce alkyl groups above butyl. There are thus now available alkyl chloroalkoxyacrylates and dialkyl chloro-alkoxymaleates with hexyl, actyl, nonyl, dodecyl, and the like as alkyl substituents. Thus, one may start with methyl β-methoxyacrylate, ethyl β-ethoxyacrylate, dimethyl α-methoxymaleate, or diethyl α-ethoxymaleate, any of which compounds is readily made and purified, and convert any one of these by methods illustrated above to the corresponding chloroacrylate or chloromaleate, which is also readily purified. The methyl or ethyl group can then be replaced with a larger group by methods also illustrated above.

We claim:

1. The process which comprises reacting the compound $$ROC=CHCOOR$$
$$|$$
$$R^x$$

with a molecular proportion of chlorine, whereby a dichloro compound is formed, heating said compound between 120° and 250° C., and separating a compound of the formula $$ROC=CClCOOR$$
$$|$$
$$R^x$$

wherein R is a non-tertiary alkyl group of not over four carbon atoms and $R^x$ is a member of the class consisting of hydrogen and the —COOR group.

2. The process which comprises reacting the compound $$ROCH=CHCOOR$$

with chlorine at 0° to 20° C., whereby a dichloro compound is formed, heating said compound between 150° and 170° C., and separating a compound of the formula $$ROCH=CClCOOR$$

wherein R is a non-tertiary alkyl group of not over four carbon atoms.

3. The process of claim 2 wherein R is the ethyl group.

4. The process of claim 2 wherein R is the methyl group.

5. The process which comprises reacting the compound $$ROC=CHCOOR$$
$$|$$
$$COOR$$

with chlorine at 0° to 20° C., whereby a dichloro compound is formed, heating said compound between 120° and 250° C., and separating a compound of the formula $$ROC=CClCOOR$$
$$|$$
$$COOR$$

wherein R is an alkyl group of not over four carbon atoms.

6. The process of claim 5 wherein R is the ethyl group.

WILLARD J. CROXALL.
MARIAN F. FEGLEY.

No references cited.